United States Patent [19]
Sasaki et al.

[11] Patent Number: 5,634,037
[45] Date of Patent: May 27, 1997

[54] MULTIPROCESSOR SYSTEM HAVING A SHARED MEMORY WITH EXCLUSIVE ACCESS FOR A REQUESTING PROCESSOR WHICH IS MAINTAINED UNTIL NORMAL COMPLETION OF A PROCESS AND FOR RETRYING THE PROCESS WHEN NOT NORMALLY COMPLETED

[75] Inventors: Takatsugu Sasaki; Akira Kabemoto; Hirohide Sugahara; Hajime Takahashi, all of Kawasaki, Japan

[73] Assignee: Fujitsu Limited, Kawasaki, Japan

[21] Appl. No.: 200,964

[22] Filed: Feb. 24, 1994

[30] Foreign Application Priority Data

Feb. 26, 1993 [JP] Japan ..................... 5-038000

[51] Int. Cl.⁶ ..................... G06F 13/00
[52] U.S. Cl. ..................... 395/479; 395/490; 395/180
[58] Field of Search ..................... 364/200 MS, 900 MS; 395/425, 474–479, 490, 494–495, 200.08, 726.18, 485

[56] References Cited

U.S. PATENT DOCUMENTS

| | | | |
|---|---|---|---|
| 4,187,538 | 2/1980 | Douglas et al. | 395/474 |
| 4,308,580 | 12/1981 | Ohtaki | 395/490 |
| 4,706,190 | 11/1987 | Bomba et al. | 395/325 |
| 5,127,098 | 6/1992 | Rosenthal et al. | 395/650 |
| 5,163,144 | 11/1992 | Ikeno | 395/479 |
| 5,263,146 | 11/1993 | Mishima | 395/490 |
| 5,274,809 | 12/1993 | Iwasaki et al. | 395/650 |
| 5,293,600 | 3/1994 | Vriezen | 395/425 |
| 5,317,749 | 5/1994 | Dahlen | 395/725 |
| 5,329,628 | 7/1994 | Yamamoto et al. | 395/425 |
| 5,341,491 | 8/1994 | Ramanujan | 395/479 |
| 5,341,510 | 8/1994 | Gillett, Jr. et al. | 395/800 |
| 5,414,856 | 5/1995 | Yokota | 395/725 |
| 5,430,860 | 7/1995 | Capps, Jr. et al. | 395/482 |

OTHER PUBLICATIONS

O'Grady et al., A performance study of mutual exclusion/synchronization mechanisms in an IEEE 796 bus multiprocessor, IEEE Micro, vol. 5, No. 4, pp. 32–47 Aug. 1985.

*Primary Examiner*—Matthew M. Kim
*Attorney, Agent, or Firm*—Staas & Halsey

[57] ABSTRACT

An exclusive control system is provided in a system having a memory module and a plurality of processing modules sharing the memory module, each of the plurality of processing modules exclusively accessing the memory module while prohibiting other processing modules from accessing the memory module. The exclusive control system includes a determination unit for determining whether or not a process executed in response to an access request from a processor module among the plurality of processing modules is normally completed in the memory module, and a retry unit for, when the determination unit determines that the process executed in response to the access request is not normally completed, retrying the process while maintaining a state in which other processing modules are prohibited from accessing the memory module.

10 Claims, 11 Drawing Sheets

FIG.II PRIOR ART

MULTIPROCESSOR SYSTEM HAVING A SHARED MEMORY WITH EXCLUSIVE ACCESS FOR A REQUESTING PROCESSOR WHICH IS MAINTAINED UNTIL NORMAL COMPLETION OF A PROCESS AND FOR RETRYING THE PROCESS WHEN NOT NORMALLY COMPLETED

BACKGROUND OF THE INVENTION (1) Field of the Invention

The present invention generally relates to a control system formed in a computer system having a plurality of processing modules and a plurality of shared memory modules, each of which processing modules has at least a main memory, a central processing unit and a connecting unit connected to a system bus, and each of which memory modules has at least a shared memory unit and a connecting unit connected to the system bus, and more particularly to a control system for controlling a process in which the processing modules exclusively access the shared memory modules.

(2) Description of the Prior Art

A computer system has been known, in which system a plurality of processing modules are coupled to a plurality of shared memory modules by system buses. Each system bus is controlled in accordance with, for example, a method referred to as a split method. By this method, activation transmission and response transmission are separately performed in an accessing operation between a processing module and a shared memory module coupled thereto by a system bus. In the period from the end of the activation transmission to the start of the response transmission, the system bus is released so that the system bus can be used by another processing module.

In the accessing operation in accordance with the above method, if the response transmission fails due to intermittent failure of the system bus, the system recognizes that the accessing operation has failed. The accessing operation is retried after the system bus is released to other processing modules.

In a case where a processing module exclusively accesses a shared memory module, the accessing processing module is informed of processing results, and it is necessary to rapidly deal with the failure of the accessing operation. Particularly, when the writing of information to the shared memory module fails, data in the shared memory module is damaged. Thus, the failure of the writing operation greatly affects the computer system.

In the system in which after the system bus is released to other processing modules, the accessing operation is retried, it is possible for another processing module to access the shared memory module in which the failure has occurred at a time when the system bus is released. Thus, there is a possibility that the failure of the writing operation in the shared memory module affects many processing modules in the system.

SUMMARY OF THE INVENTION

Accordingly, a general object of the present invention is to provide a novel and useful exclusive shared memory control system in which the disadvantages of the aforementioned prior art are eliminated.

A specific object of the present invention is to provide an exclusive shared memory system in which the probability of failure of the response transmission, caused by an intermittent failure of the system bus, is decreased so that the reliability of the exclusive writing into the shared memory is improved.

The above objects of the present invention are achieved by an exclusive control system provided in a system having a memory module and a plurality of processing modules sharing the memory module, each of the plurality of processing modules exclusively accessing the memory module while prohibiting other processing modules from accessing the memory module, the exclusive control system comprising: determination means for determining whether or not a process executed in response to an access request from a processing module among the plurality of processing modules is normally completed in the memory module; and retry means for, when the determination means determines that the process executed in response to the access request is not normally completed, retrying the process while maintaining a state in which other processing modules are prohibited from accessing the memory module.

According to the present invention, if the process in response to the access request from the processing module has been not normally completed, the process is retried. Thus, the probability of failure of the process in response to the access request from the processing module can be decreased. In addition, when the process is retried, the state in which the other process modules are prohibited from accessing the memory module is maintained. Thus, failure occurring in the memory module is prevented from affecting many processing modules.

Additional objects, features and advantages of the present invention will become apparent from the following detailed description when read in conjunction with the accompanying drawings.

DESCRIPTION OF THE PREFERRED EMBODIMENTS

Figure 1:
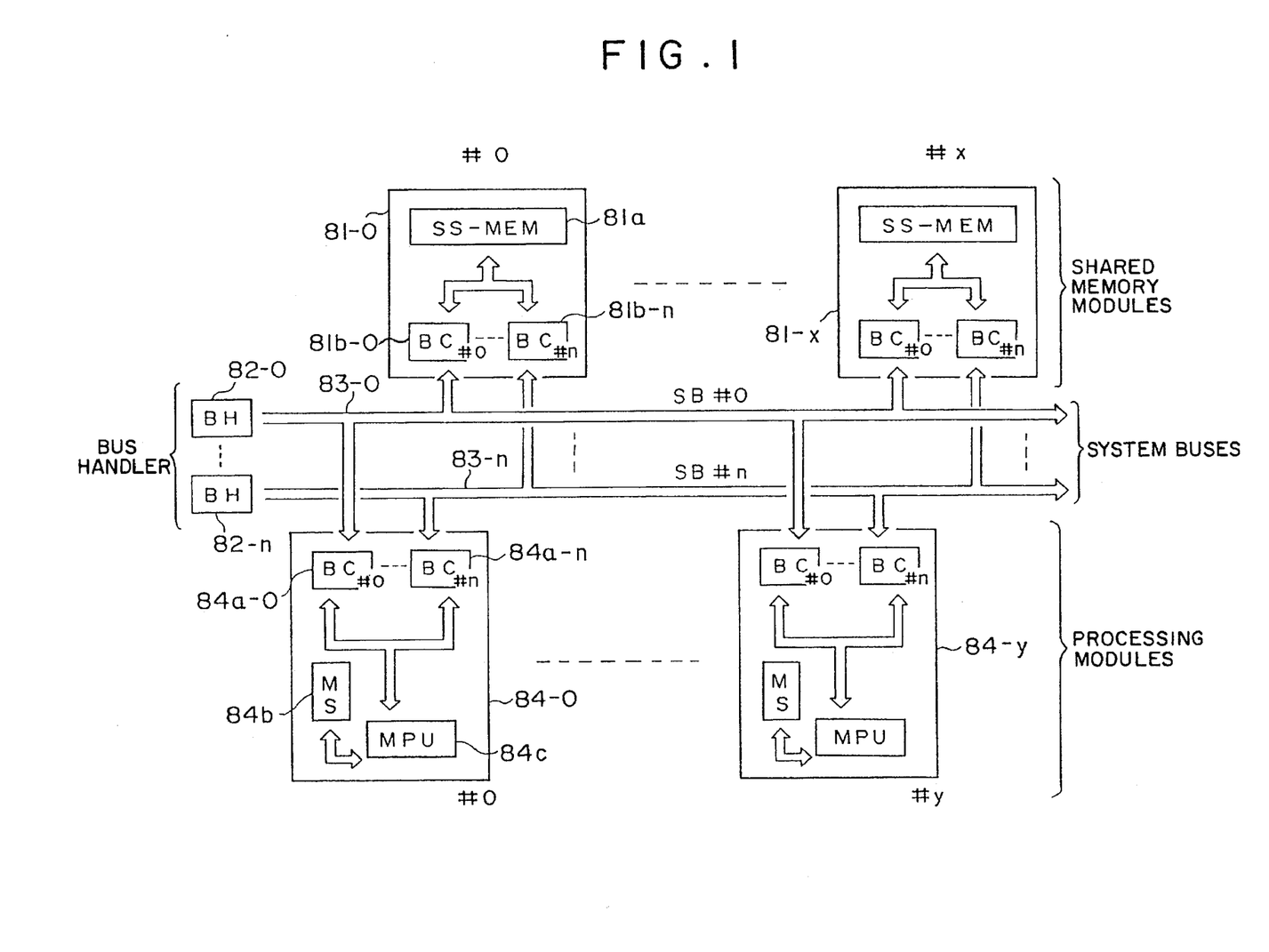
FIG. 1 is a block diagram illustrating a computer system including an exclusive shared memory control system.

A computer system including an exclusive shared memory control system is formed as shown in FIG. 1.

Referring to FIG. 1, a computer system has a plurality of shared memory modules 81-0 (#0)–81-$x$ (#x) and a plurality of processing modules 84-0 (#0)–84-$y$ (#y). The shared memory modules 81-0–81-$x$ and the processing modules 84-0–84-$y$ are coupled by system buses 83-0 (SB#0)–83-$n$ (SB#n), and 82-$n$ so that the shared memory modules 81-0–81-$x$ can be accessed by each of the system processing modules 84-0 –84-y. The system buses 83-0–83-n are controlled by bus handlers (BH) 82-0–82-n. Each of the shared memory modules 81-0–81-x has a shared memory unit 81a (SS-MEM) and bus controllers 81b-0–81b-n. The bus controllers 81b-0–81b-n are connected to the system buses 83-0–83-n and the shared memory unit 81a. Each of the processing modules 84-0–84-y has bus controllers (BC) 84a-0–84a-n, a main memory (MS) 84b and a central processing unit (MPU) 84c. The central processing unit 84c is coupled to the main memory 84b and the bus controllers 84a-0–84a-n. The bus controllers 84a-0–84a-n are connected to the respective system buses 83-0–83-n.

Figure 2:
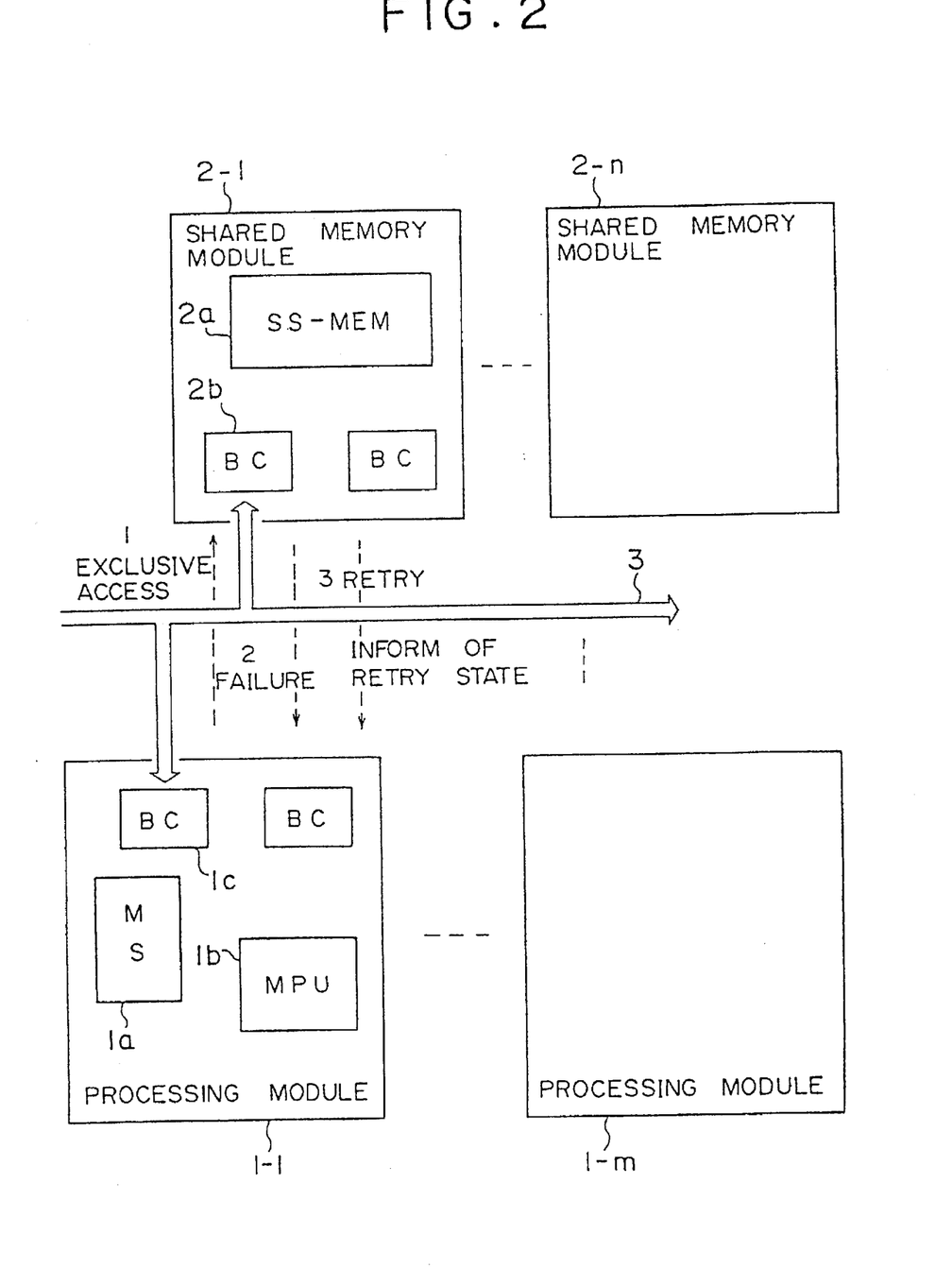
FIG. 2 is a block diagram illustrating the principle of an exclusive shared memory control system according to an example of the present invention.

A description will now be given, with reference to FIG. 2, of the principle of the exclusive control system according to an embodiment of the present invention. FIG. 2 shows a typical computer system, including the exclusive control system according to the present invention. Referring to FIG. 2, a plurality of shared modules 2-1, . . . , and 2-n, each of which has a shared memory unit 2a and bus controllers 2b, and a plurality of processing modules 1-1, . . . , and 1-m, each of which has bus controllers 1c, a main memory 1a and a central processing unit 1b, are coupled to each other by a system bus 3, in the same manner as those shown in FIG. 1. A processing module 1-i (i is one of numbers 1, 2, . . . , and m) exclusively accesses a shared memory module 2-j (j is one of numbers 1, 2, . . . , n) under a condition in which other processing modules are inhibited from accessing the shared memory module 2-j (1). The shared memory module 2-j, which is accessed by the processing module 1-i informs the processing memory module 1-i, of processing results. If the shared memory module 2-j fails to inform the processing module 1-i of the processing results, due to a failure such as an intermittent failure of the system bus 3 (2), the condition in which the other processing modules are inhibited from accessing the shared memory module 2-j is maintained, and the shared memory module 2-j retries informing the processing module 1-i of the processing results (3).

In above system, since, if the shared memory module 2-j fails to inform the processing module 1-i of the processing results, the shared memory 2-j retries informing the processing module 1-i under a condition in which the other processing modules are inhibited from accessing the shared memory module 2-j, the probability of the processing results in the shared memory module 2-j not being supplied to the processing module 1-i at all is reduced. As a result, the reliability of the exclusive writing operation in the shared memory module is improved.

Figure 3:
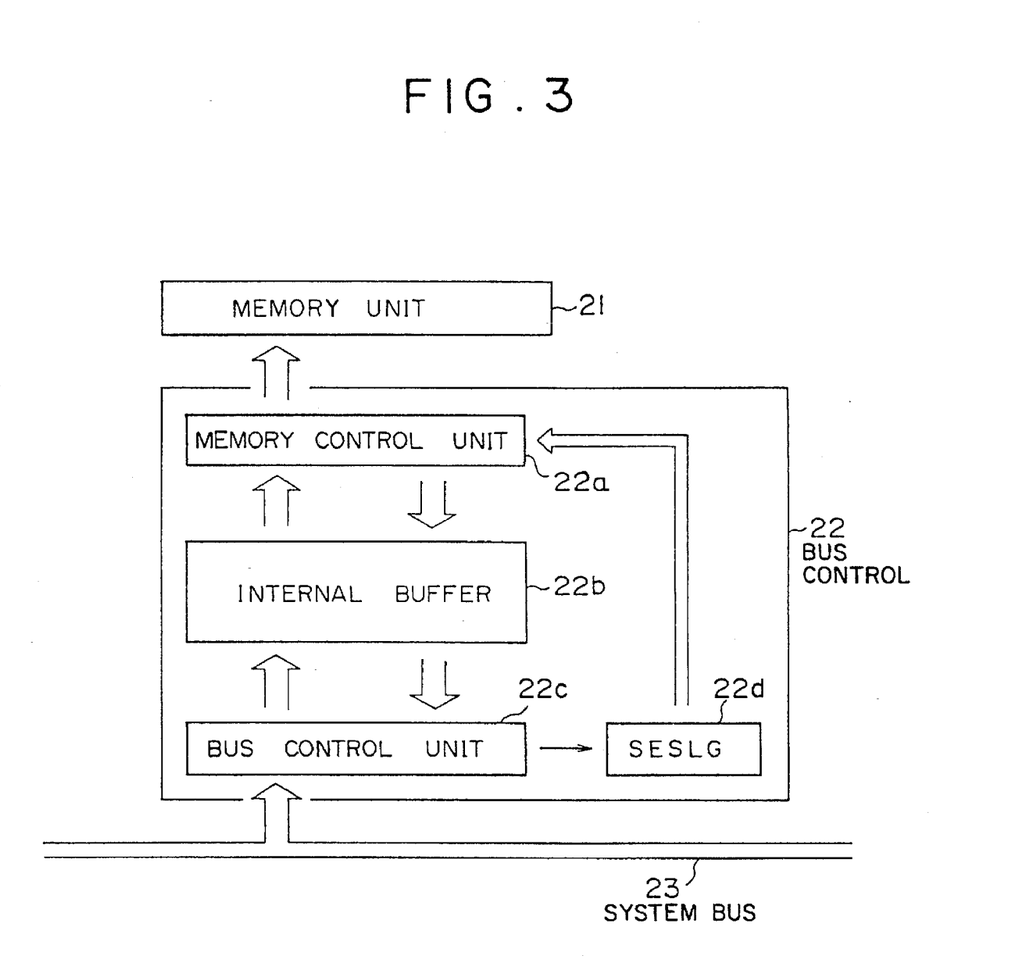
FIG. 3 is a block diagram illustrating a shared memory module as shown in FIG. 1.

FIG. 3 shows a structure of each of the bus controllers in each of the shared memory modules. Referring to FIG. 3, a bus controller 22 is coupled to a shared memory unit 21 and a system bus 23. The bus controller 22 comprises a memory control unit 22a, an internal buffer 22b, a bus control unit 22c and an SSM exclusive store log 22d (hereinafter referred to as an SESLG 22d). The memory control unit 22a controls read/write operations of the shared memory unit 21. The internal buffer 22b stores information such as commands, addresses and data. The SESLG 22d stores state information indicating that transmission of processing results has been retried, and transmits the state information stored therein to the processing module. The transmission of the processing results is referred to as status transmission.

Figure 4:
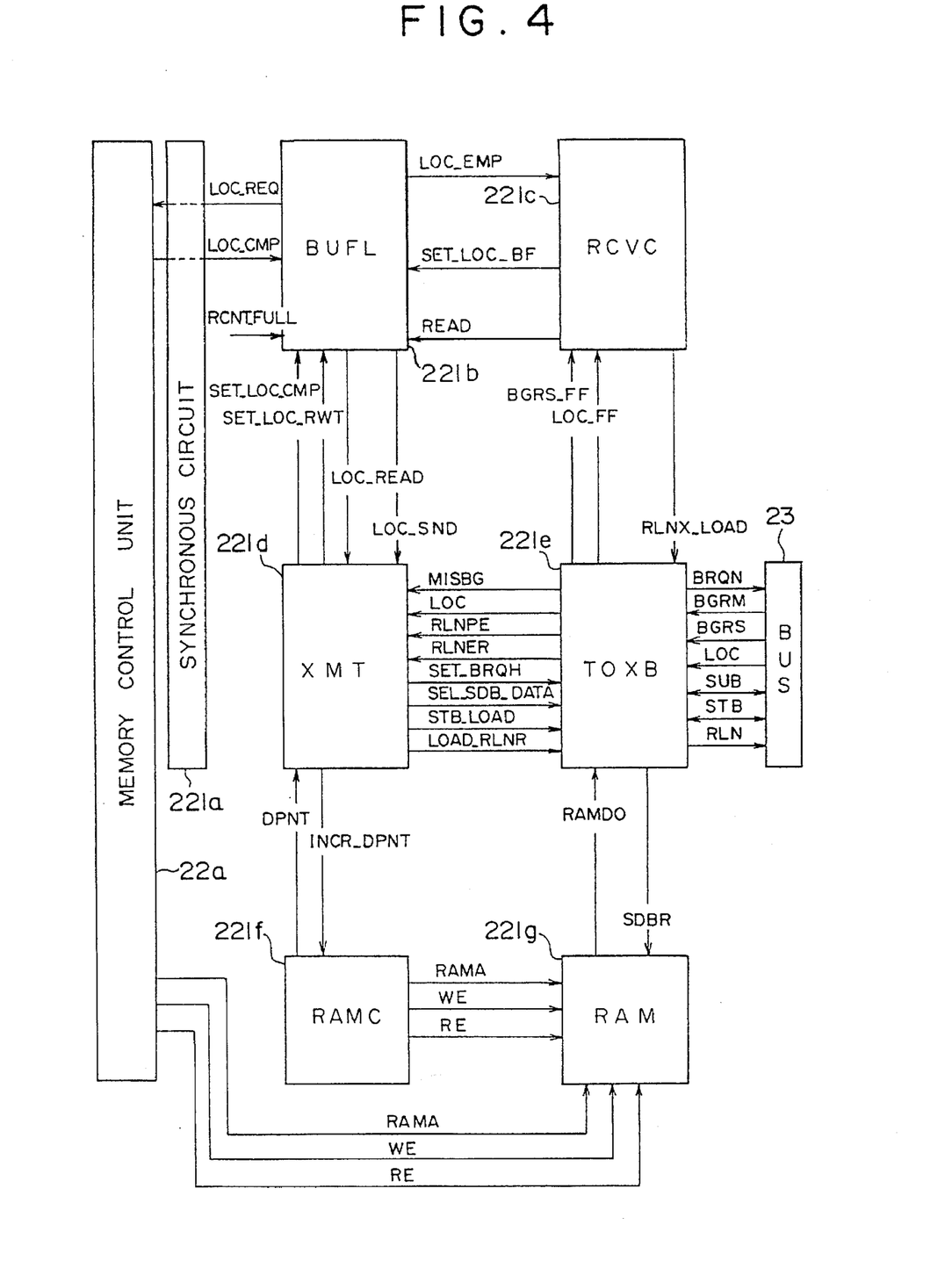
FIG. 4 is a block diagram illustrating a bus control unit as shown in FIG. 1

The bus control unit 22c shown in FIG. 3 is formed as shown in FIG. 4. Referring to FIG. 4, the bus control unit 22c is provided between the memory control unit 22a and the system bus 2. The bus control unit 22c has a synchronous circuit 221a, an internal buffer control unit ("BUFL") 221b, a receiver control unit ("RCVC") 221c, a transmitter ("XM") 221d, a TOXB bus 221e, a RAM control unit ("RAMF") 221f and a RAM 221g.

The internal buffer control unit 221b stores the state of an LOCK instruction buffer provided in the internal buffer 22b. When the shared memory module fails in the status transmission, the internal buffer control unit 221b retries the status transmission. The internal buffer control unit 221b receives a process completion message LOCK_CMP supplied from the memory control unit 22a through the synchronous circuit 221a. A message SET_LOCK_BF indicating completion of storing of an LOCK instruction and a read signal READ are supplied from the receiver control unit 221c to the internal buffer control unit 221b. The internal buffer control unit 221b also receives a completion message SET_LOCK_CMP indicating completion of the status transmission and a retry instruction message SET_LOCK_RWT indicating instruction of the status transmission both of which messages are supplied from the transmitter 221d. Furthermore, the internal buffer control unit 221b receives a signal RNCT_FULL indicating that an interval timer (not shown) has reached a time assigned to the retry of the status transmission. The internal buffer control unit 221b outputs a request LOCK_REQ to process a command stored in the RAM 221g, and the processing request LOCK_REQ is supplied to the memory control unit 22a. A signal LOCK_EMP indicating that the LOCK instruction buffer is empty is supplied from the internal buffer control unit 221b to the receiver control unit 221c. A signal LOCK_READ indicating an operation of reading the LOCK instruction and a signal LOCK_SND indicating request of the status transmission to a processing module are also supplied from the internal buffer control unit 221b to the transmitter 221d.

The receiver control unit 221c receives data supplied from the system bus 23 through the TOX bus 221e. The signal LOCK_EMP is supplied from the internal bus control unit 221b to the receiver control unit 221c as described above, and a signal BRGS_FF indicating that data on the system bus 23 is addressed to this module and a signal LOCK_FF indicating that a command on the system bus 23 is an exclusive control instruction are supplied from the TOX buffer 221e to the receiver control unit 221c. The LOCK signal on the system bus 23 is synchronized by a flip flop, so that the signal LOCK_FF is obtained. In addition, the receiver control unit 221c supplies a signal RLNX_LOAD to the TOX bus 221e in response to a signal RLN which is a signal used to indicate a command receiving state.

The transmitter 221d controls a transmitting operation and is activated when the transition to the status transmission state is performed in the internal buffer 22b. The transmitter 221d is provided with the signals LOCK_READ and LOCK_SND supplied from the internal buffer control unit 221b as described above, and signals MISBG, LOCK, RNLPE, and RNLPER are supplied from the TOX bus 221e to the transmitter 221d. The signal MISBG indicates that the right to use the system bus 23 has not been obtained within a predetermined period after a signal BRQH, which is a signal requesting use of the system bus 23, is output. The LOCK signal indicates the presence of an LOCK instruction. The signal RNLPE indicates that a parity error is detected in the signal RLN. The signal RNLPER indicates that extraordinary data is detected in the RLN signal. Furthermore, the transmitter 221d receives a signal DPNT representing an address of the RAM 221g in which data used by the transmitter 221d is stored, the signal DPNT being supplied from the RAM control unit 221f. In addition, the transmitter 221d supplies the signals SET_LOCK_CMP and SET_LOCK_RWT to the internal buffer control unit 221b as described above. The transmitter 221d also supplies an output request SET_BRQH, a selecting signal SEL_SDB_DATA, data STB_LOAD and a signal LOAD_RLNR to the TOX bus 221e, and supplies an increment instruction INCR_DPNT to the RAM control unit 221f. The output request SET_BRQH is a signal requesting to output a bus request to the bus handler. The selecting signal SEL_SDB_DATA is a signal selecting data to be set in a transmission data buffer. The data STB_LOAD is output to a tag bus through which identification signals of addresses, data and commands pass. The signal LOAD_RLNR indicates that the loading to the RLN buffer is permitted. The increment instruction request INCR_DPNT indicates request of increment of the address signal DPNT.

The TOX bus 221e receives data from the system bus 23, and supplies received data from the transmitter 221d to the system bus 23. The TOX bus 221e monitors the RLN signal and the BGRM signal on the system bus to detect errors in the status transmission. The TOX bus 221e is provided with the signal RLNX_LOAD in response to the RLN signal supplied from the receiver control unit 221c described above. The TOX bus 2213 also receives signals BGRM, BGRS and the LOCK signal all of which are supplied from the system bus 23, receives data RAMDO read out from the RAM 221g and further receives the signals SET_BRQH, SEL_SDB_DATA, STB_LOAD, and LOAD_RLNR. The signal BGRM indicates that the use of the system bus 23 has been obtained. The signal BGRS indicates that the TOX bus 221e is selected as a bus slave. The TOX bus 221e supplies a signal requesting the use of the system bus 23 to the system bus 23, and supplies the signals MISBG, LOCK, RNLPE and RNLPER to the transmitter 221d. Furthermore, the TOX bus 221 supplies the signals BGRS_FF and LOCK_FF to the receiver control unit 221c, and supplies the write data SDBR to the RAM 221g. The signals SDB, STB and RNL are transmitted from the TOX bus 221e to the system bus 23 and vice versa.

The RAM control unit 221f controls the RAM 221g so that data supplied from the system bus 23 is stored in the RAM 221g. The RAM control unit 221f is provided with the signal INCR_DPNT supplied from the transmitter 221d, and supplies the signal DPNT to the transmitter 221d. Furthermore, the RAM control unit 221f supplies an address signal RAMA, a write enable signal WE and a read enable signal RE to the RAM 221g.

The RAM 221g is provided with the address signal RAMA, the write enable signal WE, the read enable signal RE and the signal SDBR from the memory control unit 22a and the RAM control unit 221f. The RAM 221g supplies the data RAMDO to the TOX bus 221e.

Figure 5:
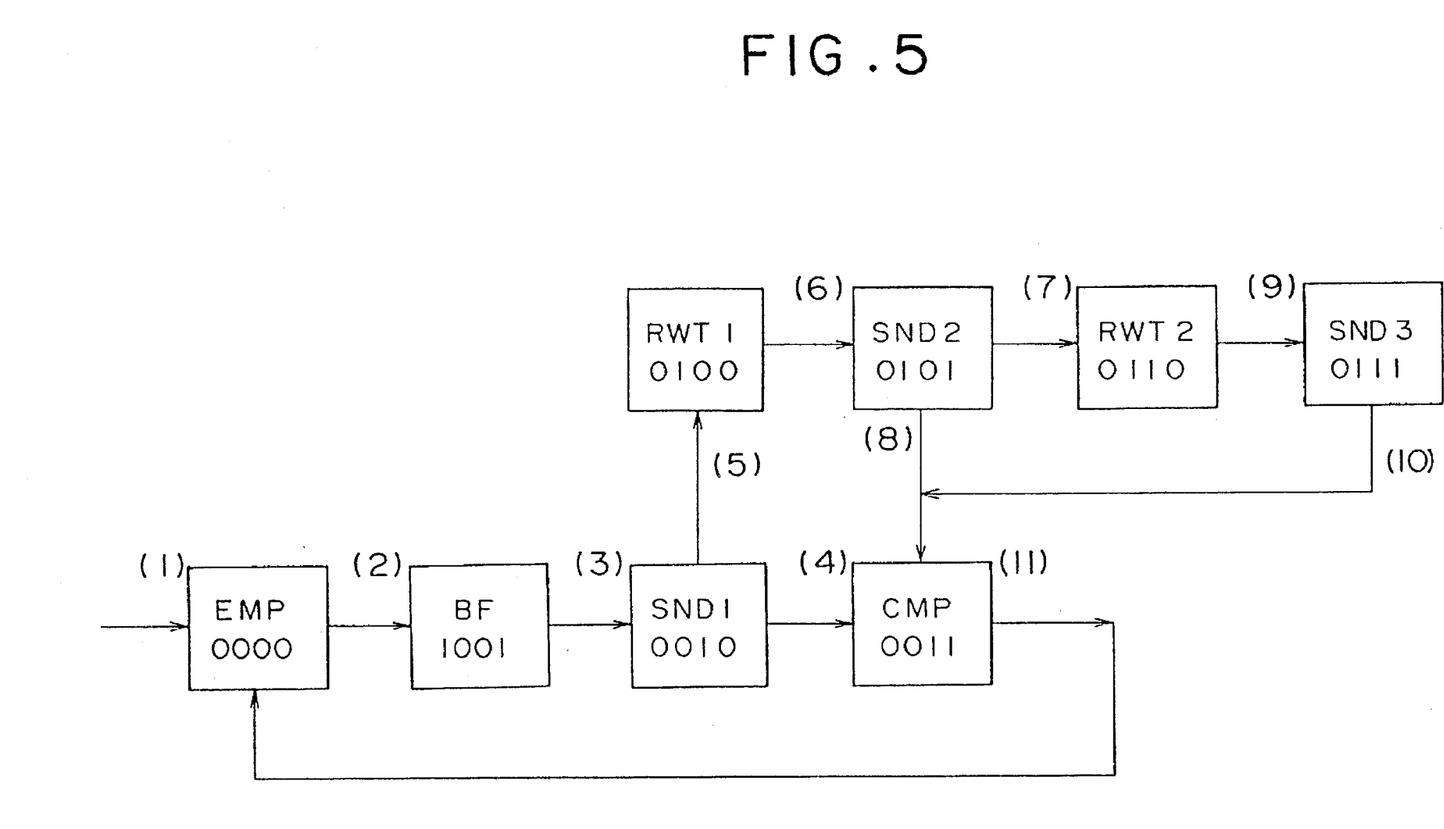
FIG. 5 is a state transition diagram illustrating an operation of an internal buffer controller shown in FIG. 4.

FIG. 5 shows the state transitions of the internal buffer control unit 221b shown in FIG. 4. Operations of the system will be described bellow, with reference to FIG. 5.

The LOCK buffer provided in the internal buffer 22b is reset when the power supply of this system is turned on ((1) in FIG. 5: POWER ON RESET). First, the internal buffer control unit 221b is in a state EMP [0000] indicating that the LOCK instruction buffer is empty. Here, when a command is supplied from the system bus to the bus controller 22 and the receiver control unit 221c receives the signal LOCK_FF indicating an exclusive control instruction, the receiver control unit 221 accepts the command if the internal buffer 22b has an empty area (the receiver control unit 221c receives the signal LOCK_EMP from the internal buffer control unit 221b). As a result, the command, an address and data are stored in the RAM 221g and the receiver control unit 221c supplies to the internal buffer control unit 221b the completion message SET_LOCK_BF indicating that the command, the address and the data have been stored in the RAM 221g.

When the internal buffer control unit 221b receives the completion signal SET_LOCK_BF supplied from the receiver control unit 221c ((2) in FIG. 5), the state transition is performed so that the internal buffer control unit 221b is in a state BF [1001] indicating that the command is stored in the LOCK instruction buffer. As a result, the internal buffer control unit 221b requests the memory control unit 22a via the synchronous circuit 221a to process the command stored in the RAM 221g and is then in a waiting state.

When the memory control unit 22a completes the process specified by the command stored in the RAM 221g and the signal LOCK_CMP is supplied to the internal buffer control unit 221b via the synchronous circuit 221a ((3) in FIG. 5), the state transition is performed so that the internal buffer control unit 221b is in a state SND1 [0010] indicating that the process specified by the command stored in the LOCK instruction buffer is completed and the status is stored in the RAM 221g. As a result, the internal buffer control unit 221b supplies to the transmitter 221d the signal LOCK_SND indicating a request for status transmission to a processing module.

When the transmitter 221d receives the signal LOCK_SND, the transmitter reads out the status from the RAM 221g and sends it to the TOX bus 221e if the receiver control unit 221c is not busy. Here, when the status transmission to the processing module has been normally performed, the transmitter 221d supplies to the internal buffer control unit 221b the completion message SET_LOCK_CMP indicating that the status transmission is completed.

When the internal buffer control unit 221b receives the completion message SET_LOCK_CMP ((4) in FIG. 5), the state transition is performed so that the state of the internal buffer control unit 221b becomes CMP [0011] indicating that the status transmission has been performed and the state of the internal control unit 221b returns to the state EMP [0000]. After this, the internal buffer control unit 221b is maintained in the waiting state until the next request is supplied thereto.

The TOX bus 221e monitors the signals RLN and BGRM on the system bus 23. When the TOX bus 221e detects, based on the signals RLN and BGRM, an error in the status transmission, the TOX bus 221e supplies to the transmitter 221d the signal MISBG indicating that the right to use the system bus 23 has not been obtained in a predetermined time after the bus request BRQH is output, the signal RNLPE indicating that a parity error has been detected in the RLN signal, or the signal RLNER indicating that a data error has been detected in the RLN signal. The transmitter 221d supplies to the internal buffer control unit 221b the signal SET_LOCK_RWT which is an instruction to retry the status transmission, and the information indicating an error has occurred is stored in the RAM 221g.

When the internal buffer control unit 221b receives the signal SET_LOCK_RWT ((4) in FIG. 5), the state transition from the state SND1 [0010] to a state RWT1 [0100] is performed, and internal buffer control unit 221b waits to receive the signal RCNT_FULL from the interval timer (not shown). When the signal RCNT_FULL is supplied from the interval timer to the internal buffer control unit 221b ((6) in FIG. 5), the state transition from the state RWT1 [0100] to a state SND2 [0101] is performed so that the internal buffer control unit 221b is in the state SND2 [0101]. In the state SND2 [0101], the transmitter 221d retries the status transmission to the processing module. When the internal buffer control unit 221b receives the completion message SET_LOCK_CMP indicating the completion of the status transmission ((8) in FIG. 5), the state transition from the state SND2 [0101] to the state EMP [0000] via the state CMP [0011] is performed. The internal buffer control unit 221b is maintained in the state EMP [0000] until the next request is supplied thereto.

On other hand, when the an error is detected in the retry of the status transmission in the state SND2 [0101] and the transmitter 221d supplies the signal SET_LOCK_RWT, indicating a retry of the status transmission, to the internal buffer control unit 221b ((7) in FIG. 5), the state transition from the state SND2 [0101] to a state RWT2 [0110] is performed so that the internal buffer control unit 221b is in the state RWT2 [0110]. The internal buffer control unit 221b is then maintained in the state RWT2 [0110] until the signal RCNT_FULL is supplied from the interval timer. When the signal RCNT_FULL is supplied from the interval timer to the internal buffer control unit 221b ((9) in FIG. 5), the state transition from the state RWT2 [0110] to a state SND3 [0111] is performed, and the status transmission is retried in the state SND3 [0111]. After this, when the internal buffer control unit 221b receives the completion message SET_LOCK_CMP or the instruction SET_LOCK_RWT of the retry of the status transmission from the transmitter 221d ((10) in FIG. 5), the state transition from the state SND3 [0111] to the state EMP [0000] via the state CMP [0011] is performed. The internal buffer control unit 221b is maintained in the state EMP [0000] until the next request is supplied thereto.

The SESLG 22d shown in FIG. 3 records state information indicating that the status transmission has been retried. When the read signal is supplied from the processing module accessing the shared memory module to the SESLG 22d, the SESLG 22d transmits to the processing module the state information regarding the retry of the status transmission.

Figure 6:
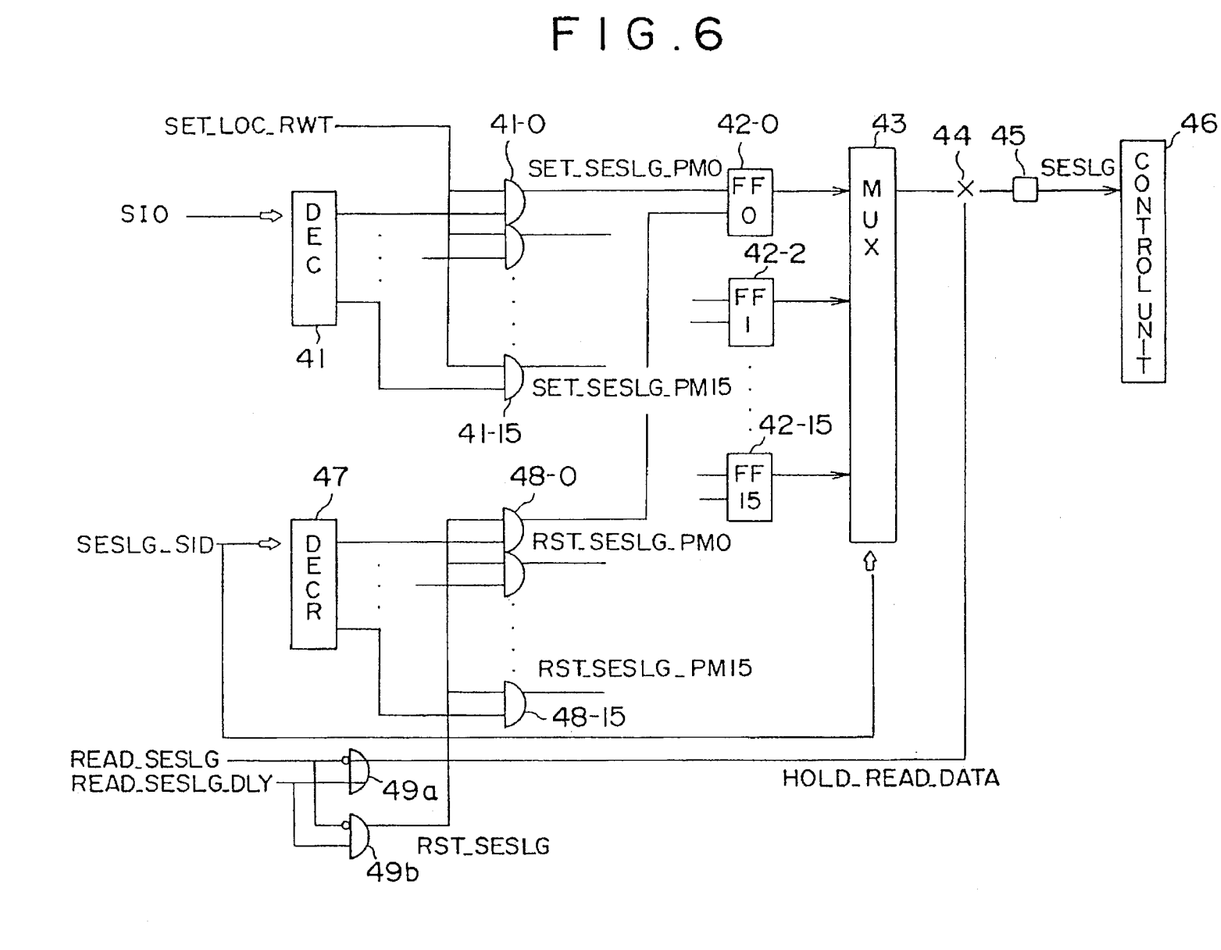
FIG. 6 is a circuit diagram illustrating an SESLG shown in FIG. 3.

The SESLG 22d is formed as shown in FIG. 6. Referring to FIG. 6, the SESLG 22d has a first decoder 41, AND gates 41-0–41-15, flip flops 42-0–42-15, a multiplexer 43, a gate 44, a latch 45 and a memory side control unit 46. When the state information indicating that the status transmission has been retried is to be recorded in the SESLG 22d, the first decoder 41 decodes an identification signal SID supplied from a processing module accessing the shared memory module and activates an output corresponding to the processing module. Each of the AND gates 41-0–41-15 is provided with a corresponding one of outputs of the first decoder 41 and the signal SET_LOCK_RWT indicating that the status transmission has been retried. The output of each of the AND gates 41-0–41-15 is connected to a set terminal of a corresponding one of the flip flops 42-0–42-15.

The SESLG 22d also has a second decoder 47, AND gates 48-0–48-15, an OR gate 49a and an AND gate 49b. When the state information is to be read out from the SESLG 22d, the second decoder 47 decodes an identification signal SESLG_SID supplied from the processing module and activates an output corresponding to the processing module. The complement/inverse of a read signal READ_SESLG supplied from the processing module when the state information is to be read out and a delayed read signal READ_SESLG_DLY are input to the AND gate 49b, so that a reset signal RST_SESLG having a narrow width corresponding to the delay time of the delayed read signal READ_SESLG_DLY is output from the AND gate 49b at a trailing edge of the read signal READ_SESLG. Each of the AND gates 48-0–48-15 is provided with a corresponding one of the outputs of the second decoder 47 and with the reset signal RST_SESLG from the AND gate 49b. The output of each of the AND gates 48-0–48-15 is connected to a reset terminal of a corresponding one of the flip flops 42-0–42-15.

The multiplexer 43 selects a flip flop corresponding to the processing module identified by the identification signal SESLG_SID from among the flip flops 42-0–42-15. The inverse of the read signal READ_SESLG and the delayed read signal READ_SESLG_DLY are input to the OR gate 49a, so that a period signal HOLD_READ_DATA having a narrow width corresponding to the delay time of the delayed read signal READ_SESLG_DLY is output from the OR gate 49b at the leading edge of the read signal READ_SESLG. The gate 44 is opened when the period signal HOLD_READ_DATA is supplied thereto.

In the SESLG 22d described above, the first decoder 41 decodes the identification signal SID supplied from a processing module, and an AND gate 41-i (i is one of numbers 0, 1, 2, . . . , and 15) corresponding to the processing module is opened. In this state, when the signal SET_LOCK_RWT indicating the status transmission retry instruction is supplied to the AND gates 41-0–41-15, a corresponding flip flop 42-i is set by the signal SET_LOCK_RWT passing through the opened AND gate 41-i. That is, the state information indicating that the status transmission has been retried is recorded in the flip flop 42-i of the SESLG 22d.

On the other hand, to read the state information from the SESLG 22d, the processing module supplies the identification signal SESLG_SID to the SESLG 22d. Then, the second decoder 47 decodes identification signal SESLG_SID, and an AND gate 48-i (i is one of numbers 0, 1, 2, . . . , and 15) corresponding to the processing module is opened. The multiplexer 43 selects the output of the flip flop 42-i corresponding to the processing module from among the outputs of the flip flops 42-0–42-15. In this state, when the read signal READ_SESLG is supplied to the SESLG 22d, the gate 44 is opened at the leading edge of the read signal READ_SESLG by the period signal HOLD_READ_DATA supplied from the OR gate 49a. As a result, the state information (e.g. "1") set in the flip flop 42-i is supplied to the latch through the multiplexer 43 and the gate 44, and it is set in the latch. After this, the flip flop 42-i is reset at the trailing edge of the read signal READ_SESLG by the reset signal RST_SESLG supplied to the flip flop 42-i through the opened AND gate 48-i. The state information set in the latch 45 is transmitted to the processing module via the memory side control unit 46 (the memory control unit 22a), the bus control unit 22c and the system bus 23.

In the above computer system, each of the processing modules can monitor at predetermined intervals, with reference to the state information in the SESLG 22d, whether or not the status transmission to a processing module has been retried. If the number of times at which the status information is read out from the SESLG 22d is large, the processing module can determine that the retry of the status transmission is repeatedly performed caused by failures in the hardware of the system bus. Based on this determination result, a decrease in activity efficiency of the system bus can be avoided.

Figure 7:
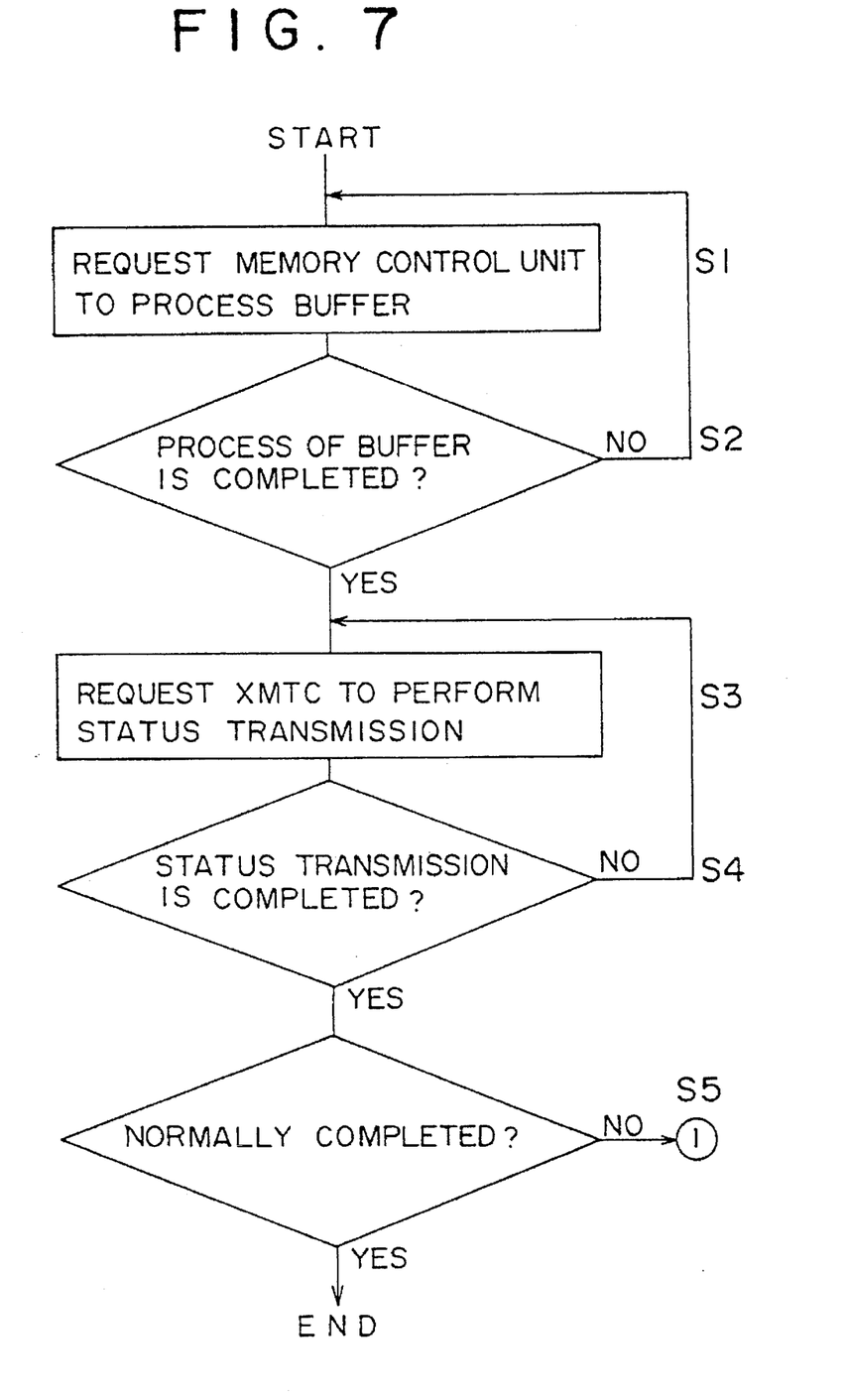
FIGS. 7, 8 and 9 are flow charts illustrating a process executed in the exclusive control system according to the embodiment of the present invention.
Figure 8:
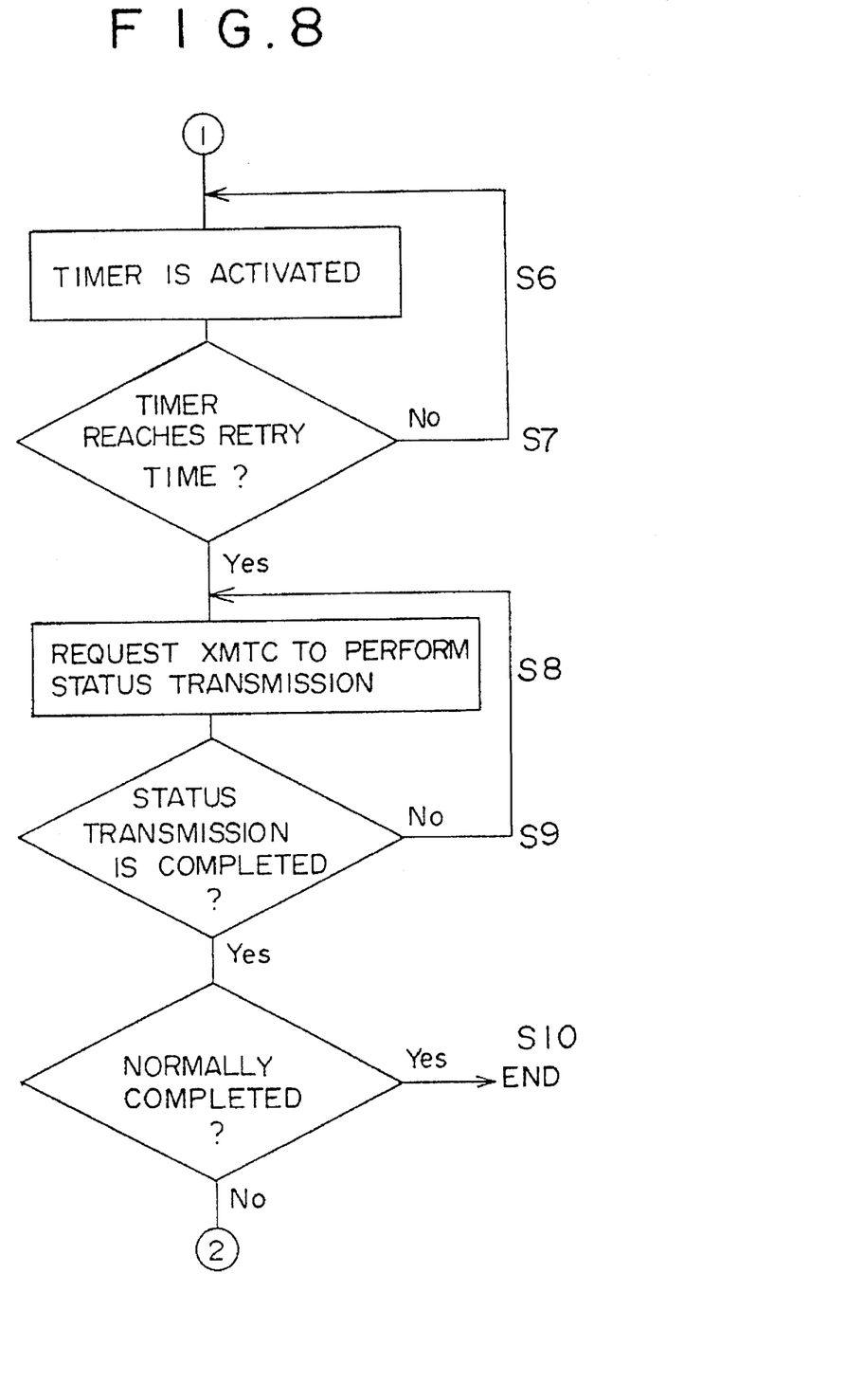
Figure 9:
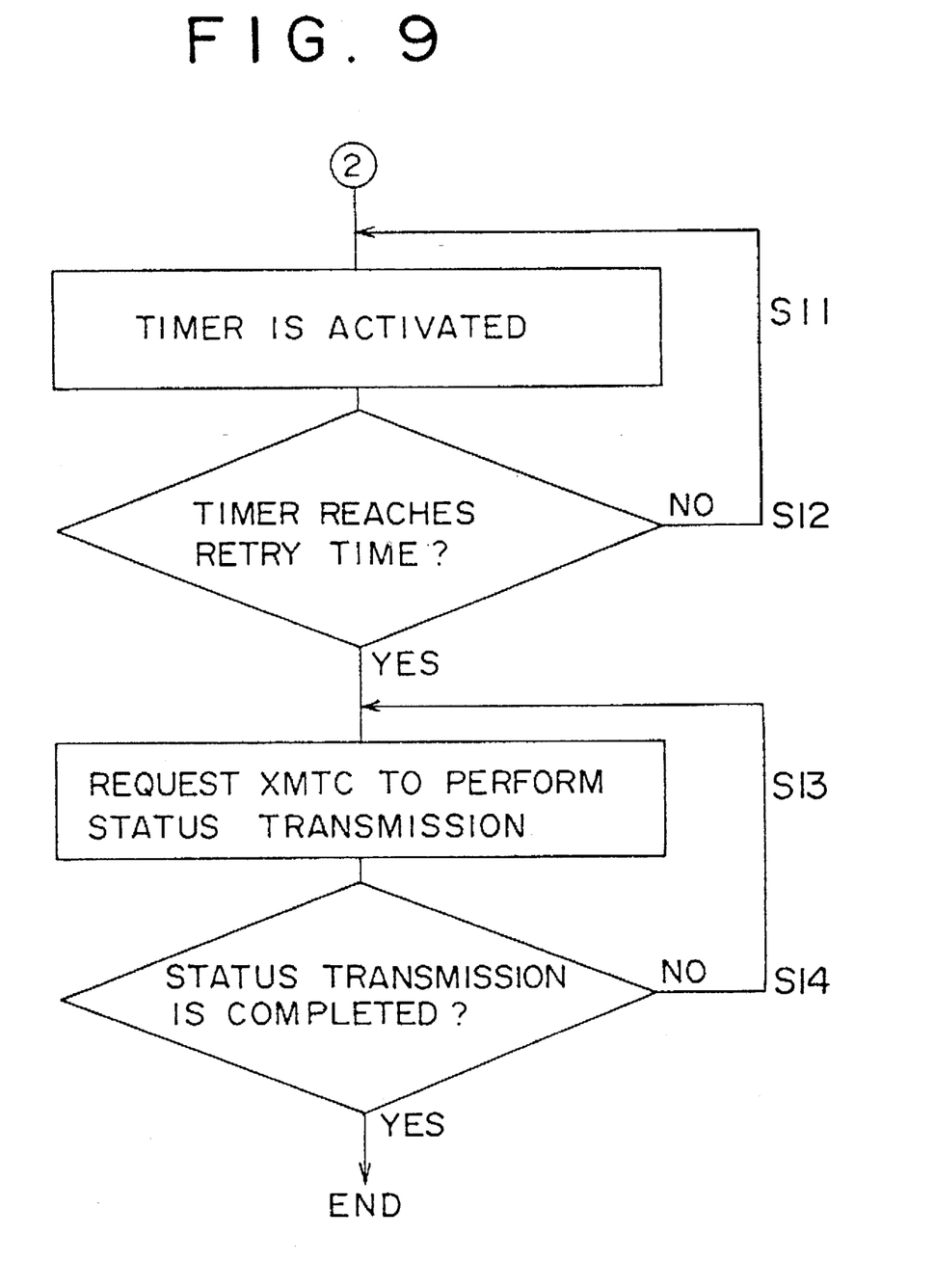

FIGS. 7, 8, and 9 show flow charts of a process in the computer system described above.

Referring to FIG. 7, in step S1, the internal buffer control unit 221b supplies processing request to process a command, an address and data stored in the internal buffer to the memory control unit 22a. It is then determined, in step S2, whether or not the processing of the internal buffer is completed. If the processing of the internal buffer is completed, the internal buffer control unit 221b supplies a status transmission request to the transmitter 221d. It is then determined, in step S4, whether or not the status transmission has been completed. After the status transmission is completed, it is determined, in step S5, whether or not the status transmission has been normally completed. If the status transmission has normally completed, the process is completed. On the other hand, if it is determined, in step S5, that the status transmission is not normally completed, the process proceeds from step S5 to step S6 shown in FIG. 8.

Referring to FIG. 8, in step S6, an interval timer is incremented, and it is determined, in step S7, whether or not the value of the interval timer has reached an retry interval at which the status transmission is to be retried. If the value of the interval timer reaches the retry interval, the internal buffer control unit 221b supplies the status transmission request to the transmitter 221d in step S8. It is then determined, in step S9, whether or not the status transmission is completed. After the status transmission is completed, it is determined, in step S10, whether or not the status transmission has normally completed. If the status transmission has normally completed, the process is completed. On the other hand, if it is determined, in step S10, that the status transmission is not normally completed, the process proceeds from step S10 to step S11. That is, the first retry of the status transmission is performed in accordance with steps S6–S10 as shown in FIG. 8.

Referring to FIG. 9, in step S11, the interval timer is incremented, and it is determined, in step S12, whether or not the value of the interval timer has reached the retry interval. If the value of the interval timer has reached the retry interval, the internal buffer control unit 221b supplies the status transmission request to the transmitter 221d in step S13. After this, it is determined, in step S14, whether or not the status transmission has normally completed. If the status transmission has normally completed, the process is completed. That is, the second retry of the status transmission is performed in accordance with steps S11–S14 as shown in FIG. 9.

Figure 10:
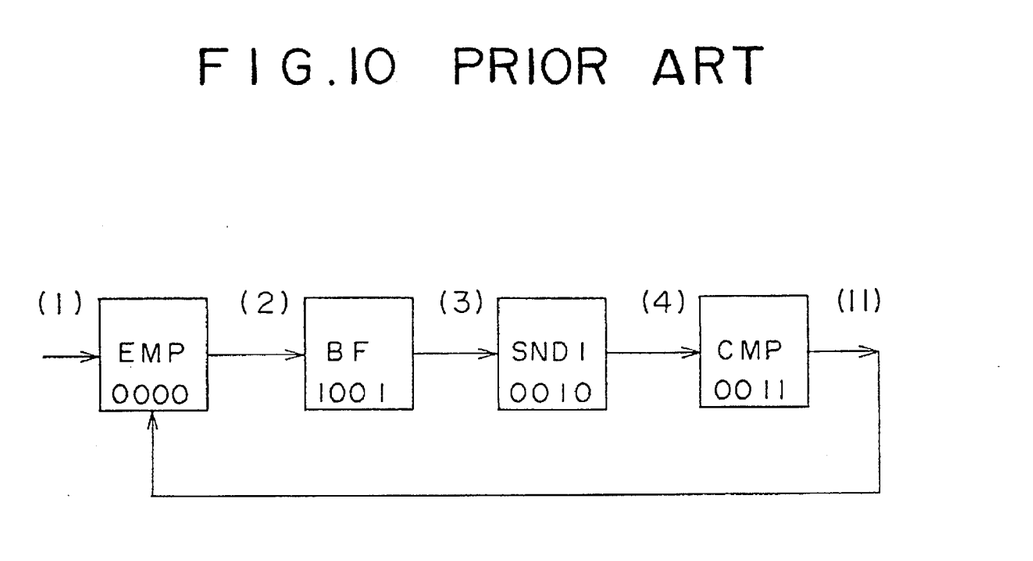
FIG. 10 is a state transition diagram illustrating an operation of a conventional system.
Figure 11:
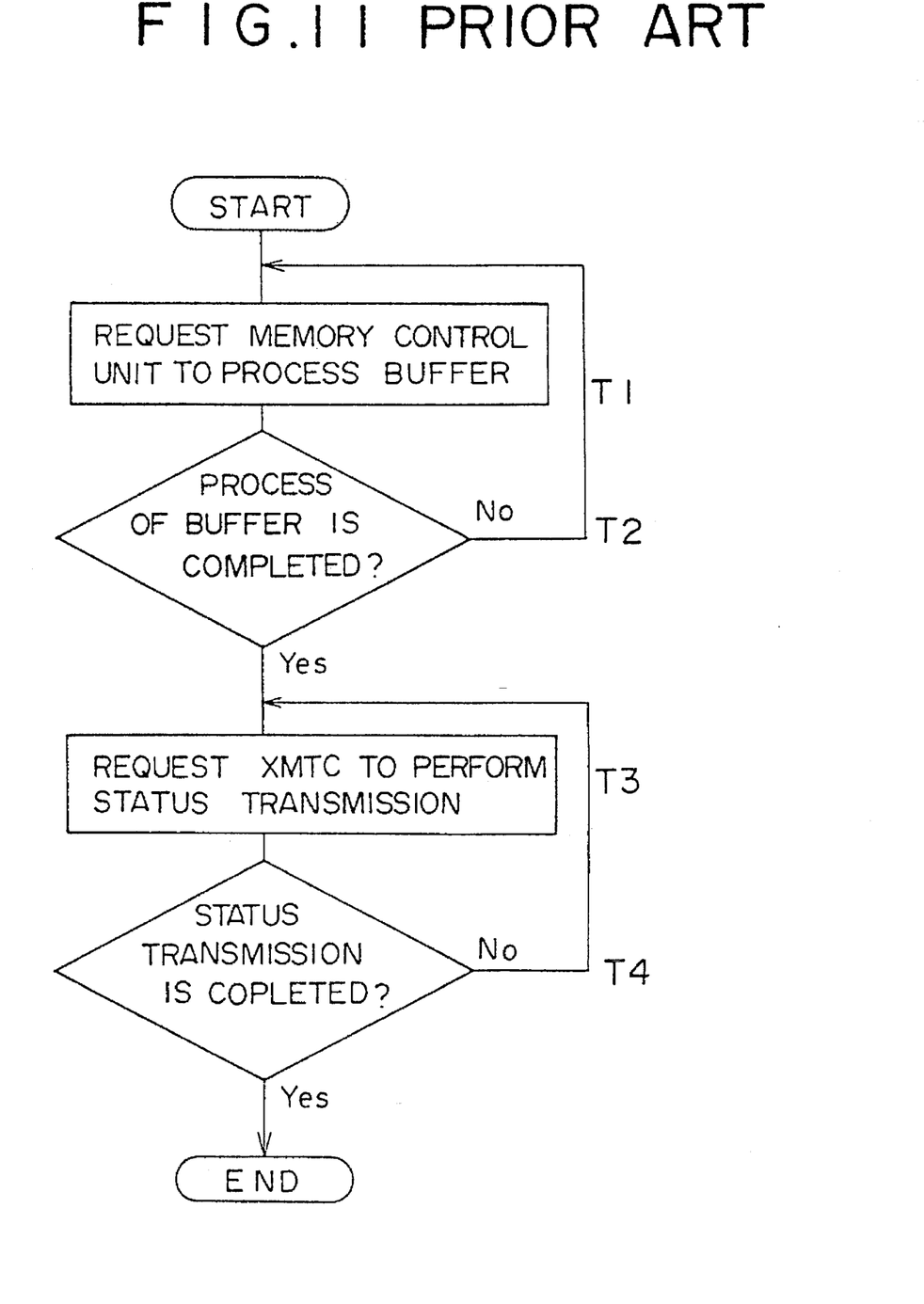
FIG. 11 is a flow chart illustrating a process of the conventional system.

FIG. 10 shows a state transition which is performed in a conventional system, and FIG. 11 shows a process performed in the conventional system.

In the conventional system, as shown in FIG. 10, the state of the internal buffer control unit 221b is changed from the state EMP [0000] to the state BF [1001] when the internal buffer controller 221b receives the completion message SET_LOCK_BF indicating that a command, an address and data have been stored in the internal buffer ((2) in FIG. 10). The state transition from the state BF [1001] to the state SND1 [0010] is performed when the internal buffer control unit 221b receives the signal LOCK_CMP indicating the completion of the process ((3) shown in FIG. 10). In the state SND1 [0010], the status transmission to the processing module is retried.

In both the cases where the internal buffer control unit 221b receives the completion message SET_LOCK_CMP indicating that the status transmission is completed and where a failure occurs in the status transmission, the state transition from the state SND1 [0010] to the state EMP [0000] via the state CMP is performed without retrying the status transmission. The internal buffer control unit 221b is then maintained in the EMP state [0000] until the next request is supplied thereto.

The process is performed in accordance with steps T1, T2, T3 and T4 as shown in FIG. 11, which steps respectively correspond to steps S1, S2, S3 and S4 as shown in FIG. 7. That is, in the conventional system, the retry of the status transmission as shown in FIGS. 8 and 9 is not performed.

In the conventional system, even if a failure occurs in the status transmission due to an intermittent failure, the state of the internal buffer control unit 221b is changed to the EMP state which is an initial state, and the internal buffer control unit 221b accepts the access from another processing module. Thus, the write error of the shared memory module affects other processing modules.

On the other hand, in the system according to the above embodiment, when a failure occurs in the status transmission, the status transmission is retried twice under a condition in which other processing modules are prohibited from accessing the shared memory module retrying the status transmission. Thus, if the retry of the status transmission is performed without failure, the status transmission to the processing module can be completed. As a result, the reliability of the exclusive writing operation of each shared memory module can be improved.

In the above embodiment, the status transmission is retried twice. However, the number of times the status transmission is retried is not limited to two.

The present invention is not limited to the aforementioned embodiments, and variations and modifications may be made without departing from the scope of the claimed invention.

What is claimed is:

1. An exclusive control system provided in a system having a memory module and a plurality of processing modules sharing said memory module, each of said plurality of processing modules exclusively accessing said memory module while prohibiting other processing modules from accessing said memory module, said exclusive control system comprising:

determination means for determining whether or not a process executed in response to an access request from a processing module, among said plurality of processing modules, is normally completed in said memory module; and retry means, responsive to a determination by said determination means that the process executed in response to the access request is not normally completed, for retrying the process while maintaining a state in which other processing modules are prohibited from accessing said memory module.

2. The exclusive control system as claimed in claim 1, wherein said determination means and said retry means are provided in said memory module.

3. The exclusive control system as claimed in claim 1, wherein said retry means retries the process a plurality of times.

4. The exclusive control system as claimed in claim 1, wherein said retry means retries the process after a predetermined time elapses starting from a time when said determination means determines that the process is not normally completed.

5. The exclusive control system as claimed in claim 3, wherein said retry means retries the process at predetermined intervals.

6. The exclusive control system as claimed in claim 1, further comprising:

recording means for recording information indicating that a retry of the process has been performed, the information recorded by said recording means being able to be monitored by said processing module which has accessed said memory module.

7. The exclusive control system as claimed in claim 6, wherein said recording means is provided in said memory module.

8. The exclusive control system as claimed in claim 6, wherein said recording means has a plurality of storage units for storing the information, each of said plurality of storage units corresponding to a respective one of said plurality of processing modules, and first selecting means for selecting a storage unit corresponding to the processing module which has accessed said memory module from among said plurality of storage units, the information being stored in the selected storage unit.

9. The exclusive control system as claimed in claim 8, wherein said recording means further comprises second selecting means responsive to a request supplied from the processing module which has accessed said memory module, for selecting the storage unit corresponding the processing module, and reading means for reading out the information from the storage unit selected by said second selecting means, the information read out by said reading means being supplied to the processing module.

10. The exclusive control system as claimed in claim 8, wherein said storage units further comprise flip flops in which the information is set.

* * * * *